United States Patent [19]

Sutton

[11] Patent Number: 5,201,235
[45] Date of Patent: Apr. 13, 1993

[54] LINKAGE FOR LOADER BUCKET OR OTHER MATERIAL HANDLING DEVICE

[75] Inventor: Lynn A. Sutton, Kewanee, Ill.

[73] Assignee: Caterpillar Inc., Peoria, Ill.

[21] Appl. No.: 870,981

[22] Filed: Apr. 20, 1992

[51] Int. Cl.$^5$ .................................................. F16H 21/44
[52] U.S. Cl. ..................................... 74/105; 414/708; 414/917
[58] Field of Search .................. 74/105, 522; 414/685, 414/700, 708, 917

[56] References Cited

U.S. PATENT DOCUMENTS

| | | | |
|---|---|---|---|
| 2,883,077 | 4/1959 | Pilch | 414/700 |
| 3,578,191 | 5/1971 | Horsch | 414/708 |
| 3,606,060 | 9/1971 | Fleming et al. | 414/708 |
| 4,486,141 | 12/1984 | Pescarmona | 414/917 X |
| 4,709,588 | 12/1987 | Cordes et al. | 414/917 X |

OTHER PUBLICATIONS

Production Training Bulletin, 926E & IT28B Vs. Competition Teardown, TEJB1020, Caterpillar Inc., Sep. 1991.
Competitive Bulletin, Caterpillar 416 Vs. Case 580K, Caterpillar Inc., TECB4068, May 1988.
Competitive Bulletin, Caterpillar 416 Vs. Ford 55B, Caterpillar Inc., TECB4054, Nov. 1985.
Competitive Bulletin, CAT 446 Vs. Dynahoe 490 Backhoe Loader, Caterpillar Inc., TECB4072, Dec. 1989.

*Primary Examiner*—Allan D. Herrmann
*Assistant Examiner*—David W. Laub
*Attorney, Agent, or Firm*—J. Wesley Blumenshine

[57] ABSTRACT

The present invention is directed to a linkage connectable between a frame and an attachment. The linkage is characterized as self-leveling, meaning that once an attitude or orientation of the attachment with respect to the ground is achieved, the linkage will maintain that attitude as the attachment is raised or lowered without additional operator input. A preferred linkage connectable between the frame of a loader vehicle and a loader bucket includes an arm pivotally connectable between the frame and bucket, a hydraulic lift cylinder pivotally connectable between the frame and arm for raising and lowering the arm and resultantly the bucket, an equalizer link pivotally connectable to the arm at the same location as the lift cylinder, a hydraulic tilt cylinder pivotally connectable between the bucket and one end portion of the equalizer link, and an equalizer bar pivotally connectable between the frame and the other end portion of the equalizer link. If the tilt cylinder is held stiff as the bucket is raised or lowered, the parallelogram action of the frame, lift arm, equalizer link and equalizer bar will be imparted to the parallelogram of the tilt cylinder, bucket, lift arm and equalizer link and will thereby automatically adjust the tilt of the bucket as it is raised or lowered to thereby maintain its original attitude with the ground. A common pivotal location of the lift cylinder and equalizer link eliminates unnecessary parts and fabrication.

5 Claims, 3 Drawing Sheets

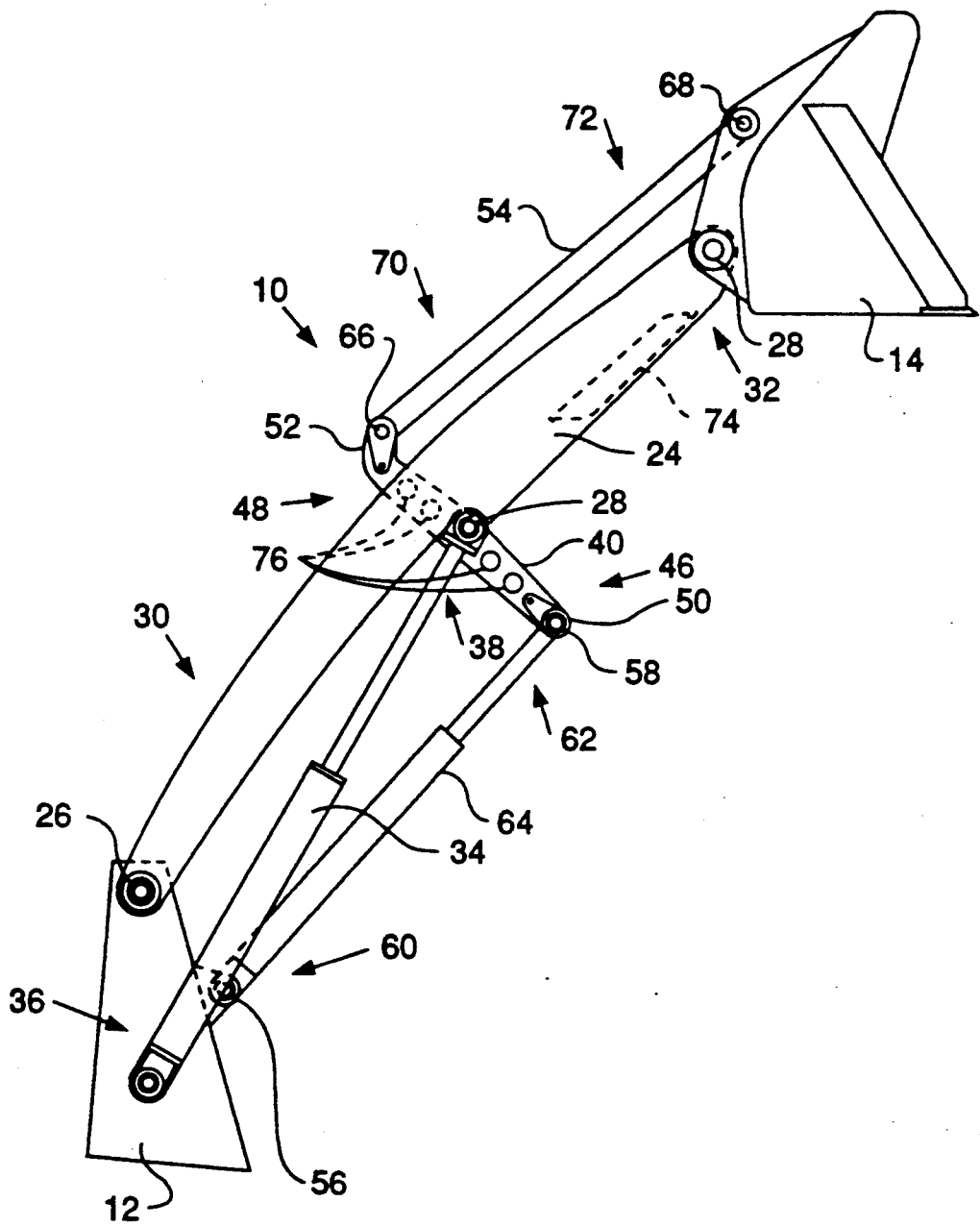

LINKAGE FOR LOADER BUCKET OR OTHER MATERIAL HANDLING DEVICE

TECHNICAL FIELD

This invention is directed to linkages connected between a frame and an attachment, and more particularly to self-leveling linkages which function in a manner that allows an attachment to retain its orientation with respect to the ground as the attachment is raised or lowered.

BACKGROUND ART

Linkages which connect attachments such as material or personnel handling devices to a rigid frame, for example, linkages which connect front buckets to backhoe loaders, may be categorized as self-leveling or non self-leveling. Many variant designs of each type exist.

Generally, non self-leveling linkages have tilt mechanisms which are not connected to the vehicle frame, therefore, when raising and lowering the attachment the attachment's attitude remains constant with respect to the linkage and does not self-level with respect to the ground. In order to prevent spillage of material over the back of the attachment as the attachment is raised, it is necessary to tilt the attachment forward in an attempt to maintain its attitude with respect to the ground. This is commonly accomplished by use of a sensor which senses the position of the attachment and activates a hydraulic valve to port hydraulic fluid to a tilt cylinder whose action attempts to maintain the necessary attitude of the attachment with the ground. Such sensors, valves, cylinders, and fluid hosing are often complex, exposed, and vulnerable to damage, these factors combining to create high cost and poor reliability. Further, such systems require continual adjustment as the attachment is raised or lowered which is time consuming, inaccurate, potentially dangerous, and costly in a production environment and a further contributor to poor performance and reliability.

Self-leveling linkages are characterized by having tilt mechanisms which react material loads into the vehicle or equipment mainframe. Tilt linkage geometry is tailored such that as the attachment is raised, the attachment's attitude toward the ground automatically adjusts to produce a predetermined leveling characteristic. Self-leveling linkages are typically complex in terms of number of parts and are costly to produce and assemble. However, typically, no adjustment is required by the operator to maintain the attachment's attitude toward the ground as the device is raised or lowered.

When using certain attachments, such as a front loader bucket, for ease of operation it is desirable to have an automatic means that will return the bucket after dumping to a position that as the bucket is lowered it is level with respect to the ground. Mechanisms employed with non-self leveling linkages to prevent spillage as the bucket is raised typically override such automatic means and prevent the bucket from rotating far enough back to be level with the ground when the bucket is lowered. Self leveling linkages typically do not exhibit this problem.

When the attachment is a pallet forks, parallel lift is desired. Non-self leveling linkages require operator input to maintain level and rely upon hydraulic system pressure to perform required tilt corrections. For obvious reasons, non self-leveling linkages are generally poor in terms of pallet fork performance. Self-leveling linkages are far superior for pallet fork leveling in that the linkage may be tailored for parallel lift without need for operator input tilt corrections.

It is the object of the present invention to provide automatic self-leveling linkages which use fewer components than known prior art which thereby translates into reduced manufacturing costs and improved reliability.

It is a further object of the present invention to provide a linkage which will make automatic adjustments to the attachment to provide exact parallel lift for any single predetermined attitude of the attachment.

It is a further object of the present invention to provide a linkage which may be tailored in the factory or at the job site for a variety of alternative paths of motion.

DISCLOSURE OF THE INVENTION

The present invention is directed to a linkage connected between a frame, such as the frame of an earthmoving or construction vehicle, and an attachment, such as a front loader bucket or pallet forks.

In one aspect of the present invention, an apparatus is provided including an arm pivotally connected at its first end portion to a frame and at its second end portion to an attachment. A first extendable/retractable device, such as a hydraulically powered lift cylinder, is pivotally connected at its first end portion to the frame and at its second end portion to the arm. An equalizer link having first and second end portions and first and second ends is pivotally connected between its ends to the arm at the same location as the first device is connected to the arm, preferably by use of the same pin. Upon operator demand, high pressure fluid can be selectively provided to the first device to cause it to extend or retract thereby raising or lowering the arm and resultantly the attachment.

In another aspect of the present invention, the apparatus also includes a second extendable/retractable device, such as a hydraulically powered tilt cylinder, pivotally connected at its first end portion to one of the end portions of the equalizer link and at its second end portion to the attachment. Upon operator demand, high pressure fluid can be selectively provided to the second device to cause it to extend or retract thereby tilting the attachment.

In another aspect of the present invention, the apparatus includes an equalizer bar pivotally connected at its first end portion to a frame and at its second end portion to the free end portion of the equalizer link.

In another aspect of the present invention, the positions of the second device and the equalizer bar are interchanged.

In a final aspect of the present invention, multiple locations for pivotal connections are provided on the equalizer link so the various linkage elements can be pinned to the equalizer link at various positions, thereby providing multiple linkage geometries, resulting in multiple attachment attitudes with respect to some reference, such as the ground.

BRIEF DESCRIPTION OF THE DRAWINGS

FIG. 3 is a side view of an alternatively preferred linkage of the present invention.

BEST MODE FOR CARRYING OUT THE INVENTION

The present invention relates to a linkage 10 connected between a frame 12 and an attachment 14.

Figure 1:
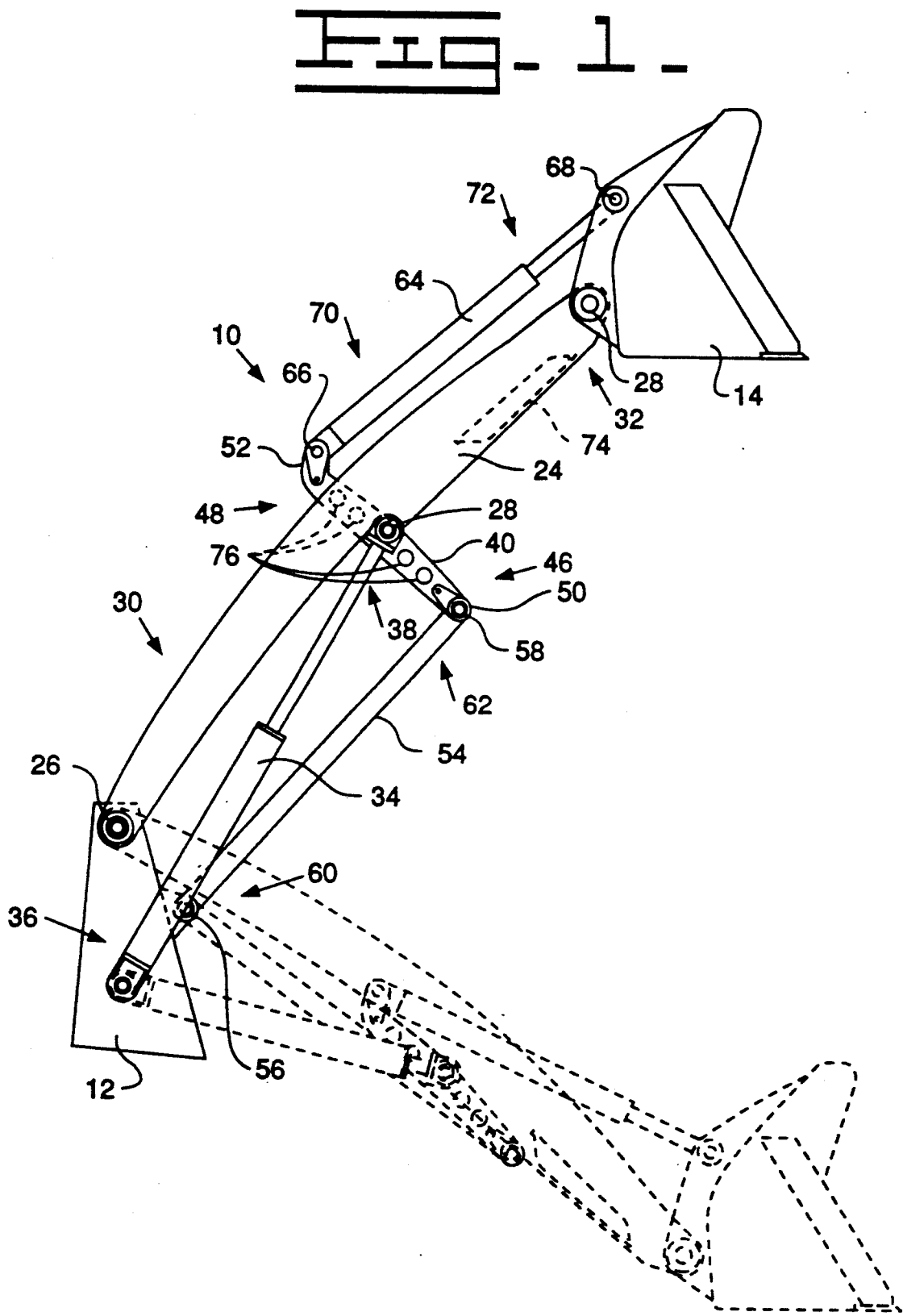
FIG. 1 is a side view of preferred linkage of the present invention supported by a frame and connected to an attachment and being shown at lowered and raised positions.
Figure 2:
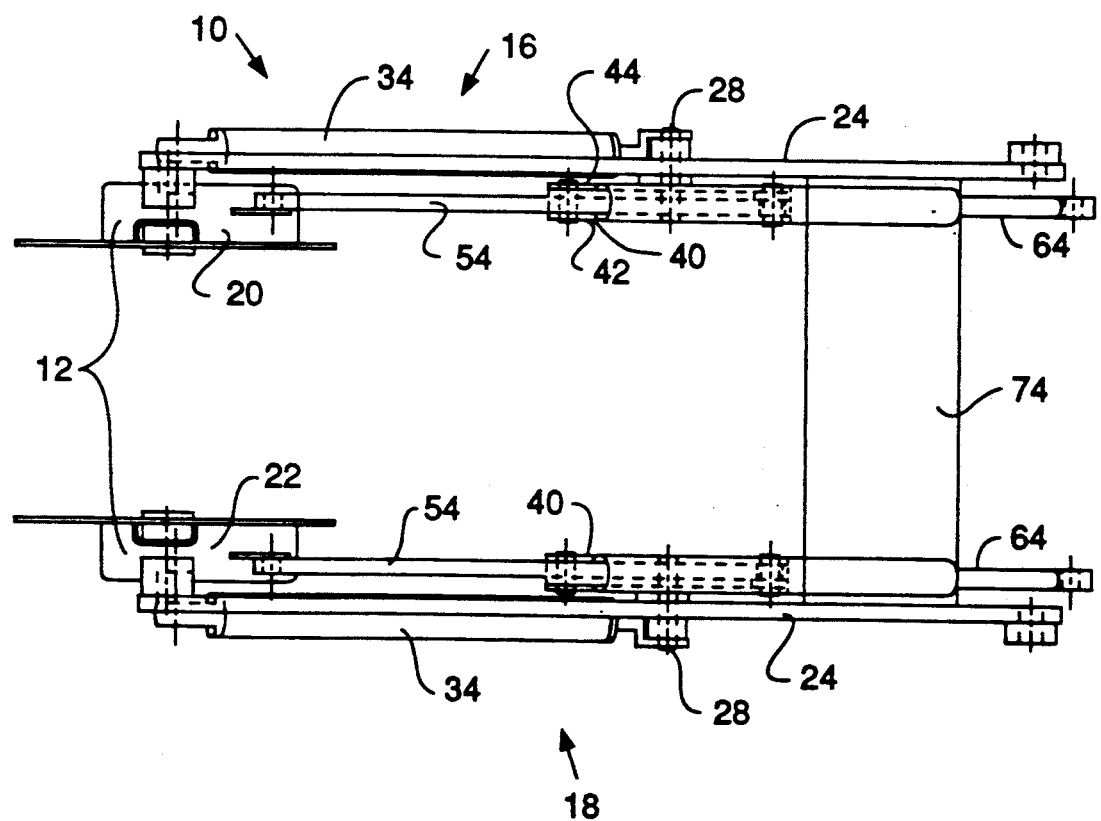
FIG. 2 is a top view of the frame and linkage shown in FIG. 1.

Referring to FIG. 1, there is shown a linkage 10 connected between a frame 12 of a vehicle and a front loader bucket 14. FIG. 1 is a side profile view, however, as shown in FIG. 2, the apparatus has two linkages 16,18 each supported at a frame member 20,22 of the vehicle and each connected to the bucket 14. Only one linkage will be described, the other being identical.

A lift arm 24 is pivotally connected by pins 26,28 at its first end portion 30 to the frame 12 and at its second end portion 32 to the bucket 14. A first extendable/retractable device 34 is used to raise and lower the lift arm 24 upon operator input. A preferred first device 34 is a hydraulic cylinder. The first device 34 is pivotally connected at its first end portion 36 to the frame 12 and at its second end portion 38 to the lift arm 24.

An equalizer link 40, comprised of two identical members 42,44 spaced parallel from one another, having first and second end portions 46,48 and first and second ends 50,52 is pivotally connected to the lift arm 24 using the same pin 28 which connects the first device 34 to the lift arm 24. The pin 28 may or may not be fixedly connected to the equalizer link 40.

An equalizer bar 54 is pivotally connected by pins 56,58 at its first end portion 60 to the frame 12 and at its second end portion 62 to the first end portion 46 of the equalizer link 40.

A second extendable/retractable device 64 is pivotally connected by pins 66,68 at its first end portion 70 to the second end portion 48 of the equalizer link 40 and at its second end portion 72 to the bucket 14. A preferred second device 64 is a hydraulic cylinder, which is used to change the attitude of the bucket 14 by tilting it upon operator demand.

A reinforcing member 74 extends between and is welded to the lift arms 24.

In an alternative embodiment, as shown in FIG. 3, the position of the equalizer bar 54 and the second device 64 are reversed with respect to their positions shown in FIG. 1, in which case extending or retracting the second device 64 will rotate the equalizer link 40 thereby driving the equalizer bar 54 to change the attitude of the bucket 14.

INDUSTRIAL APPLICABILITY

The linkage 10 operates in the following manner. The lift arm 24 is raised and lowered upon operator demand by extending or retracting the first device 34. If the second device 64 is held stationary (i.e., not extended or retracted) while the lift arm 24 is raised or lowered, the frame 12, equalizer bar 54, equalizer link 40 and the lift arm 24 comprise a rotatable four-bar parallelogram linkage 10 which drives the ridged second device 64 to change the attitude of the bucket 14 as it is raised or lowered thereby automatically producing the desired self-leveling characteristic without any need for tilt corrections by the operator. The attitude of the bucket 14 can be changed at any time upon operator demand by extending or retracting the second device 64.

It is desirable that an easily repeatable reference be established for a known desirable attachment 14 position. For instance, it may be desired when raising or lowering a front bucket 14 that the bucket 14 remain at the position which holds the most material possible. To quickly and easily attain this position, it may be desirable that this position correspond to the second device 64 being fully retracted.

However, for parallel lift of pallet forks 14, if the same lift arm 24, equalizer bar 54, second device 64 and equalizer link 40 were used, the second device 64 might have to be extended somewhat. To quickly, easily, and repeatedly find the parallel position would be difficult. However, if a different length second device 64 is used in which parallel corresponds to full retraction of the second device 64, then parallel can quickly, easily, and repeatedly be found.

Perhaps easier than changing the second device 64, a number of different geometry equalizer links 40 can be carried by the operator which can be changed in the field so different desired attitudes of attachments 14 can be achieved at a repeatable reference such as full retraction of the second device 64.

Another alternative is to provide multiple pivotal locations 76 on the equalizer link 40, so the various linkage elements can be pinned to the equalizer link 40 at various positions, thereby providing multiple linkage geometries, resulting in multiple possible attitudes of the attachment 14 with respect to some reference, such as the ground. For example, multiple holes could be provided on the equalizer link 40 to pin the equalizer bar 54 or second device 64 so the attitude of the attachment 14 corresponding to full retraction of the second device 64 can be changed simply by repinning the second device 64 or equalizer bar 54 at different positions on the equalizer link 40.

Other aspects, objects and advantages of this invention can be obtained from a study of the drawings, the disclosure, and the appended claims.

I claim:

1. An apparatus, comprising:
an arm having first and second end portions, said arm being pivotally connectable at said first end portion to a frame and pivotally connectable at said second end portion to an attachment;
a first extendable/retractable device having first and second end portions, said first device being pivotally connectable at one of said first and said second end portions to said frame and said first device being pivotally connectable at the other of said first and said second end portions to said arm; and
an equalizer link having first and second end portions and first and second ends, said equalizer link being pivotally connectable between said first and second ends to said arm;
said first extendable/retractable device and said equalizer link being pivotally connectable to said arm at the same location on said arm.

2. An apparatus, comprising:
an arm having first and second end portions, said arm being pivotally connectable at said first end portion to a frame and pivotally connectable at said second end portion to an attachment;
a first extendable/retractable device having first and second end portions, said first device being pivotally connectable at one of said first and said second end portions to said frame and said first device being pivotally connectable at the other of said first and said second end portions to said arm;
an equalizer link having first and second end portions and first and second ends, said equalizer link being pivotally connectable between said first and second ends to said arm;

said first extendable/retractable device and said equalizer link being pivotally connectable to said arm at substantially the same location on said arm; and a second extendable/retractable device having first and second end portions, said second device being pivotally connectable at one of said first and said second end portions to one of said first and said second end portions of said equalizer link and at the other of said first and said second end portions to said attachment.

3. The apparatus as claimed in claim 2, including an equalizer bar having first and second end portions, said equalizer bar being pivotally connectable at one of said first and said second end portions to a frame and at the other of said first and said second end portions to the other of said first and said second end portions of said equalizer link.

4. An apparatus, comprising:

an arm having first and second end portions, said arm being pivotally connectable at said first end portion to a frame and pivotally connectable at said second end portion to an attachment;

a first extendable/retractable device having first and second end portions, said first device being pivotally connectable at one of said first and said second end portions to said frame and said first device being pivotally connectable at the other of said first and said second end portions to said arm;

an equalizer link having first and second end portions and first and second ends, said equalizer link being pivotally connectable between said first and second ends to said arm;

said first extendable/retractable device and said equalizer link being pivotally connectable to said arm at substantially the same location on said arm; and a second extendable/retractable device having first and second end portions, said second device being pivotally connectable at one of said first and said second end portions to said frame and at the other of said first and said second end portions to one of said first and said second end portions of said equalizer link.

5. The apparatus as claimed in claim 4, including an equalizer bar having first and second end portions, said equalizer bar being pivotally connectable at one of said first and said second end portions to the other of said first and said second end portions of said equalizer link and at the other of said first and said second end portions to said attachment.

* * * * *